(12) United States Patent
Lennevi et al.

(10) Patent No.: US 11,667,213 B2
(45) Date of Patent: Jun. 6, 2023

(54) ELECTROMOBILITY SYSTEM FOR A VEHICLE

(71) Applicant: VOLVO TRUCK CORPORATION, Gothenburg (SE)

(72) Inventors: Jerker Lennevi, Lerum (SE); Jörgen Kjellberg, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/649,126

(22) Filed: Jan. 27, 2022

(65) Prior Publication Data

US 2022/0242275 A1 Aug. 4, 2022

(30) Foreign Application Priority Data

Feb. 4, 2021 (EP) .................................. 21155124

(51) Int. Cl.
*B60L 58/20* (2019.01)
*B60L 1/00* (2006.01)

(52) U.S. Cl.
CPC ............... *B60L 58/20* (2019.02); *B60L 1/00* (2013.01); *B60L 2200/40* (2013.01); *B60L 2210/10* (2013.01)

(58) Field of Classification Search
CPC ........ B60L 58/20; B60L 1/00; B60L 2200/40; B60L 2210/10
See application file for complete search history.

(56) References Cited

U.S. PATENT DOCUMENTS

| 6,507,506 B1 | 1/2003 | Piñas et al. |
| 9,908,506 B2 * | 3/2018 | Taylor ..................... B60L 53/80 |

(Continued)

FOREIGN PATENT DOCUMENTS

| CN | 103029593 A | * | 4/2013 |
| CN | 105452036 B | * | 9/2019 | ............... B60K 6/20 |

(Continued)

OTHER PUBLICATIONS

European Search Report dated Aug. 23, 2021 in corresponding European Patent Application No. 21155124.7, 9 pages.

*Primary Examiner* — Adam D Houston
(74) *Attorney, Agent, or Firm* — Venable LLP; Jeffri A. Kaminski

(57) ABSTRACT

An electromobility system for a vehicle comprising a primary sub-system including at least a first battery pack arrangement to power an electric machine for propelling the vehicle, a secondary sub-system being a high voltage sub-system and including at least a second battery pack arrangement to power an auxiliary equipment, and a DC/DC-converter galvanically separating the primary sub-system from the secondary sub-system. The system, in a first state, powers the electric machine by the first battery pack arrangement of the primary sub-system independently of the secondary sub-system, and powers the auxiliary equipment by the second battery pack arrangement in the secondary sub-system independently of the primary sub-system, and in a second state, powers the auxiliary equipment by the second battery pack arrangement of the secondary sub-system and, via the DC/DC-converter, the first battery pack arrangement of the primary sub-system.

14 Claims, 3 Drawing Sheets

(56) References Cited

U.S. PATENT DOCUMENTS

| | | | |
|---|---|---|---|
| 2010/0133900 A1 | 6/2010 | King | |
| 2011/0089887 A1* | 4/2011 | Ward | B60L 53/14 320/101 |
| 2012/0146572 A1* | 6/2012 | Ward | B60L 8/003 320/101 |
| 2014/0012446 A1* | 1/2014 | Kumar | B60W 10/08 903/930 |
| 2014/0028256 A1* | 1/2014 | Sugiyama | B60L 53/22 320/109 |
| 2014/0097792 A1* | 4/2014 | Su | B60L 53/12 320/108 |
| 2014/0336855 A1 | 11/2014 | Kwon et al. | |
| 2016/0121749 A1 | 5/2016 | Mensah-Brown et al. | |
| 2016/0241028 A1* | 8/2016 | Long | H02J 7/0025 |
| 2017/0282747 A1* | 10/2017 | Wang | B60L 58/20 |
| 2018/0037124 A1* | 2/2018 | Jang | B60L 1/00 |
| 2018/0272882 A1* | 9/2018 | Fontana | G06F 21/44 |
| 2019/0366958 A1* | 12/2019 | Kreth | B60R 16/0238 |
| 2022/0103003 A1* | 3/2022 | Sahoo | H02J 1/02 |
| 2022/0158549 A1* | 5/2022 | Lu | B60L 53/22 |
| 2022/0242275 A1* | 8/2022 | Lennevi | B60L 1/00 |
| 2022/0258602 A1* | 8/2022 | Ban | B60W 20/40 |

FOREIGN PATENT DOCUMENTS

| | | | |
|---|---|---|---|
| DE | 102016200097 A1 | 7/2017 | |
| DE | 102018221195 A1 | 6/2020 | |
| EP | 1925493 A2 * | 5/2008 | B60L 1/003 |
| GB | 2599386 A * | 4/2022 | B60L 1/00 |
| GB | 2599388 A * | 4/2022 | B60L 1/00 |
| JP | 2009055690 A * | 3/2009 | |
| JP | 2021191231 A * | 12/2021 | B60R 16/033 |
| WO | 2015124161 A1 | 8/2015 | |
| WO | WO-2015192133 A2 * | 12/2015 | B60L 53/14 |
| WO | 2017173420 A1 | 10/2017 | |
| WO | WO-2020193466 A1 * | 10/2020 | B60L 1/006 |

\* cited by examiner

ELECTROMOBILITY SYSTEM FOR A VEHICLE

TECHNICAL FIELD

The present invention relates to an electromobility system for a vehicle. The invention further relates to a method for operating an electromobility system in a vehicle, a computer program, a computer readable medium and to a vehicle.

BACKGROUND

A vehicle typically comprises an engine or machine for propelling the vehicle. The engine may be powered by various means, such as e.g. by a liquid or gaseous fuel in an internal combustion engine, or by electric power to an electric machine. Moreover, hybrid solutions exist in which e.g. the vehicle is propelled both by an internal combustion engine and an electric machine. In either way, an energy storage device is used to store the energy needed in order to propel the vehicle. Energy storage devices may further be used to power auxiliary loads and auxiliary equipment in the vehicle.

For many vehicles, the energy storage devices are comprised in an energy storage system, wherein the energy storage system is configured to power an engine or machine for propelling the vehicle, and any auxiliary loads via an electromobility system. For certain vehicles, an auxiliary equipment, typically being a bodybuilder application such as e.g. a lifting arrangement or cement mixer, is in need of electrical powering. For an electric vehicle in which the energy storage devices are batteries or battery packs, the electromobility system of the vehicle may be configured to operate the electric machine as well as any electrically driven auxiliary equipment or bodybuilder application.

However, the auxiliary equipment or bodybuilder application may be an add-on to the vehicle, and thus be installed subsequently to designing and manufacturing the vehicle itself. When installing such add-on to the vehicle, the current electromobility system of the vehicle is often used also to power the added auxiliary equipment or bodybuilder application. As the electrical properties, and power requirements, typically vary depending on the nature of the add-on, and as the current electromobility system of the vehicle has certain limitations, the auxiliary equipment or bodybuilder application added to vehicle must be carefully chosen and/or requires cumbersome retrofitting of the vehicle's electromobility system. There is thus a need in the industry for an improved electromobility system of the vehicle.

SUMMARY

It is an object of the present invention to at least partly alleviate the shortcomings discussed above in relation to known electromobility systems, and to improve the operation thereof.

According to at least a first aspect of the present invention, an electromobility system for a vehicle is provided. The system comprising:
a primary sub-system including at least a first battery pack arrangement configured to power an electric machine for propelling the vehicle,
a secondary sub-system including at least a second battery pack arrangement configured to power an auxiliary equipment,
a DC/DC-converter arranged and configured to galvanically separate the primary sub-system from the secondary sub-system, wherein the system is configured to:
in a first state, power the electric machine by the first battery pack arrangement of the primary sub-system independently of the secondary sub-system, and power the auxiliary equipment by the second battery pack arrangement in the secondary sub-system independently of the primary sub-system; and
in a second state, power the auxiliary equipment by the second battery pack arrangement of the secondary sub-system and, via the DC/DC-converter, the first battery pack arrangement of the primary sub-system.

Hereby, the primary sub-system may be operated autonomously of the secondary sub-system. For example, different secondary sub-systems may be connected via the DC/DC-converter to the primary sub-system, without changing the configuration, design or operational power of the primary sub-system. Stated differently, the secondary sub-system may change without changing the configuration, design or operational power of the primary sub-system. For example, during manufacturing of the vehicle, the primary sub-system may be designed and manufactured together with the vehicle without any adaptions being made for any later connected secondary sub-system or the secondary battery pack arrangement, potentially except for the DC/DC-converter. Thus, the secondary sub-system may be designed and adapted to the auxiliary equipment without any adaptions being made for the primary sub-system and the functionality of powering the electric machine for propelling the vehicle. Moreover, the auxiliary equipment, being for example a bodybuilder application, may be varied without concerns of the primary sub-system and the functionality of powering the electric machine for propelling the vehicle, as the adaption in relation to the various auxiliary equipment is made by the secondary sub-system.

Moreover, as some properties of the electromobility system, such as e.g. isolation, inductance and capacitance, add up with an increasing number of components in the system, and as there are legal and practical electrical limitations linked to these properties, the possibilities to conventionally extend the electromobility system are constrained. By providing a DC/DC-converter arranged and configured to galvanically separate the primary sub-system from the secondary sub-system, such constrains are reduced or even avoided, as the secondary sub-system may operate independently and autonomous of the primary sub-system. Thus, the ability to accept larger variance of e.g. isolation, inductance and capacitance in the system is improved. Stated differently, by the invention, properties of the electromobility system, such as e.g. isolation, inductance and capacitance, are split in two sub-systems (primary and secondary) with their respective sub-system properties. Thus, the properties of the primary sub-system are not impacted by the auxiliary equipment, and the properties of the primary sub-system may thus be better tuned to be compatible with e.g. the capacitance restrictions imposed from connection to the charging infrastructure. Moreover, the properties of secondary sub-system allow for larger variations of contribution to such properties from the auxiliary equipment. The electromobility system may be simply referred to as an electrical system, or an electrical system for a vehicle.

A particular property of the electromobility system is harmonics. Switching power electronic converter units create harmonics (voltage ripple), which propagate along cables in the system. Harmonics from different sources add up to complex harmonics and may lead to durability issues and/or functional breakdown. By providing a DC/DC-converter arranged and configured to galvanically separate the primary sub-system from the secondary sub-system, the insensitivity to harmonic disturbances between the auxiliary equipment and components of the primary sub-system is improved.

A further advantage of galvanically separating the primary sub-system from the secondary sub-system, is that the risk of unwanted interference by the auxiliary equipment is reduced. For example, containment of a fault in the auxiliary equipment and/or the secondary sub-system is improved resulting in a reduced the risk of jeopardizing the functionality of the primary sub-system. Moreover, as the vehicle's electromobility system typically comprises a protective system to avoid electric shock or arcing events causing disturbances or even interruption of the propulsion of the vehicle, conventional addition of unknown auxiliary equipment to the system requires that the added auxiliary equipment is fully compliant with the existing protective systems, which is quite constraining to the added auxiliary equipment. By galvanically separating the primary sub-system from the secondary sub-system, the requirement for compatibility of the auxiliary equipment with the vehicle's protective systems is facilitated.

By providing both the primary sub-system and the secondary sub-system with a respective battery pack arrangement, the electric machine in the primary sub-system and the auxiliary equipment in the secondary sub-system may be operated independently in the first state. For example, the auxiliary equipment may be operated in accordance with a base load. Moreover, by providing the functionality of transferring power between the primary sub-system and the secondary sub-system, more power than what is provided by the secondary sub-system may be used to power the auxiliary equipment, for example during a high or maximum load of the auxiliary equipment. Moreover, by providing both the primary sub-system and the secondary sub-system with a respective battery pack arrangement, the capacity of DC/DC-converter can be more freely chosen, with maintained functionality of the system. For example, the DC/DC-converter can be reduced in size and capacity compared to a system in which the auxiliary equipment is not powered by a battery pack arrangement configured to power the auxiliary equipment independently of the primary sub-system.

According to at least one example embodiment, the first battery pack arrangement comprises at least one battery pack. The first battery pack arrangement may comprise a plurality of battery packs. Thus, in the first state, at least one battery pack in the first battery pack arrangement powers the electric machine, and in the second state at least one battery pack in the first battery pack arrangement (e.g. the same battery pack as in the first state) powers the auxiliary equipment via the DC/DC-converter. The battery pack(s) of the first battery pack arrangement may be referred to as first battery pack(s) or primary battery pack(s), and/or the first battery pack arrangement may be referred to as a primary battery pack arrangement. According to at least one example embodiment, the second battery pack arrangement comprises at least one battery pack. The second battery pack arrangement may comprise a plurality of battery packs. Thus, in the first state, at least one battery pack in the second battery pack arrangement powers the auxiliary equipment, and in the second state at least one battery pack in the second battery pack arrangement (e.g. the same battery pack as in the first state) powers the auxiliary equipment together with at least one battery pack of the first battery pack arrangement. The battery pack(s) of the second battery pack arrangement may be referred to as second battery pack(s) or secondary battery pack(s) and/or the second battery pack arrangement may be referred to as a secondary battery pack arrangement.

According to at least one example embodiment, the second battery pack arrangement is, in the electromobility system, arranged to be galvanically separated by means of the DC/DC-converter from the first battery pack arrangement, while still being operable to power the auxiliary equipment in the secondary sub-system. According to at least one example embodiment, at least one battery pack of the second battery pack arrangement is, in the electromobility system, arranged to be galvanically separated by means of the DC/DC-converter from at least one battery pack of the first battery pack arrangement, while still being operable to power the auxiliary equipment in the secondary sub-system. Typically, all of the battery packs in the second battery pack arrangement are, in the electromobility system, galvanically separated by means of the DC/DC-converter from all of the battery packs in the first battery pack arrangement.

According to at least one example embodiment, the system is configured to,
in the first state, power the electric machine by the first battery pack arrangement of the primary sub-system independently of the second battery pack arrangement, and power the auxiliary equipment by the second battery pack arrangement in the secondary sub-system independently of the first battery pack arrangement.

According to at least one example embodiment, in the second state, the system is configured to power the auxiliary equipment by the second battery pack arrangement and the first battery pack arrangement, wherein power from the first battery pack arrangement is transferred via the DC/DC-converter. Thus, in the second state, the auxiliary equipment is powered by the secondary sub-system and the primary sub-system.

According to at least one example embodiment, in the first state, the DC/DC-converter is not transferring power, and may be referred to as being in an inactive condition. Hence, in the first state, the electric machine is powered by the first battery pack arrangement independently of the DC/DC-converter, and the auxiliary equipment is powered by the second battery pack arrangement independently of the DC/DC-converter. In the second state, the DC/DC-converter is transferring power from the primary sub-system to the secondary sub-system, and may be referred to as being in an active condition.

According to at least one example embodiment, the system is configured to, in the second state, power the electric machine by the first battery pack arrangement of the primary sub-system in addition to transferring power to the secondary sub-system via the DC/DC-converter.

According to at least one example embodiment, the primary sub-system is configured to galvanically connect the first battery pack arrangement with the electric machine, and the secondary sub-system is configured to galvanically connect the second battery pack arrangement with the auxiliary equipment.

That is, when the electromobility system is installed into the vehicle, the first battery pack arrangement is galvanically connected to the electric machine in the primary sub-system, and the second battery pack arrangement is galvanically connected to the auxiliary equipment in the secondary sub-system. That is, in the first state, at least one battery pack of the first battery pack arrangement is galvanically connected to the electric machine, and at least one battery pack of the second battery pack arrangement is galvanically connected to the auxiliary equipment. The electromobility system may e.g. comprise a network of cables or similar that galvanically connects the electrical components as the battery packs and loads. For example, the network of cables is divided into a first network of cables for connecting electrical components in the primary sub-system, and a second network of cables for connecting electrical components in the secondary sub-system. Moreover, one or more busbars and/or one or more junction boxes may be used in the network of cables. For example, a first junction box is used within the first network of cables and a second junction box is used within with the second network of cables. According to one example embodiment, the network of cables has a daisy chain arrangement.

According to at least one example embodiment, the auxiliary equipment is galvanically separated from the primary sub-system. According to at least one example embodiment, the auxiliary equipment is separated from the primary sub-system. According to at least one example embodiment, the auxiliary equipment is not part of the primary sub-system.

According to at least one example embodiment, the DC/DC-converter is a galvanically separating DC/DC-converter.

Hereby, an effective means of galvanically separating the primary sub-system and the secondary sub-system is provided. That is, the primary sub-system and the secondary sub-system are galvanically separated by means of the galvanically separating DC/DC-converter. The galvanically separating DC/DC-converter may be referred to as an isolating DC/DC-converter. Thus, when the electromobility system is installed into the vehicle, the first battery pack arrangement is galvanically connected to the electric machine and galvanically separated or isolated from the auxiliary equipment by means of the galvanically isolated DC/DC-converter, and the second battery pack arrangement is galvanically connected to the auxiliary equipment, and galvanically separated or isolated from the electric machine by means of the galvanically isolated DC/DC-converter.

According to at least one example embodiment, the DC/DC-converter is a unidirectional DC/DC-converter configured to transfer power from the primary sub-system to the secondary sub-system.

Hereby, the DC/DC-converter may be made less complex while still serving the purpose of transferring power from the primary sub-system to the auxiliary equipment in the second state.

According to at least one alternative example embodiment, the DC/DC-converter is a bidirectional DC/DC-converter configured to transfer power from the primary sub-system to the secondary sub-system, and from the secondary sub-system to the primary sub-system. Hereby, the system may be configured to, in a third state, supply power to the primary sub-system, e.g. powering an auxiliary load or the electric machine, from the second battery pack arrangement of the secondary sub-system via the DC/DC-converter. Moreover, the battery pack(s) of the first battery pack arrangement may be charged by means of the secondary battery pack arrangement via the DC/DC-converter (e.g. in the third state, or in a separate alternative third state).

According to at least one example embodiment, the system is configured to charge the second battery pack arrangement of the secondary sub-system by the primary sub-system via the DC/DC-converter.

Charging of the second battery pack arrangement of the secondary sub-system by the primary sub-system via the DC/DC-converter may e.g. be performed by the first battery pack arrangement or a charging interface. Such charging is typically performed in the second state, or in a separate alternative second state.

According to at least one example embodiment, the operating voltage of the secondary sub-system is between 60 V and 850 V.

Thus, the secondary sub-system is configured to power corresponding electrical components or loads, such as the auxiliary equipment. The secondary sub-system is typically configured for direct current (DC). According to at least one example embodiment, the operating voltage of the secondary sub-system is between 80 V and 850 V, or between 100 V and 850 V, or between 120 V and 850 V, or between 220 V and 850 V, or between 400 V and 850 V. Alternatively, the operating voltage of the secondary sub-system is between 80 V and 400 V, or between 80 V and 220 V, or between 80 V and 120 V, or between 80 V and 100 V. According to at least one example embodiment, the secondary sub-system is a high voltage sub-system.

According to at least one example embodiment the second battery pack arrangement is a high voltage battery pack arrangement of between 60 V and 850 V, or any of the example ranges mentioned above in relation to the operating voltage of the secondary sub-system.

According to at least one example embodiment, the operating voltage of the primary sub-system is between 500 V and 1500 V. According to at least one example embodiment, the operating voltage of the primary sub-system is between 550 V and 1500 V, or between 580 V and 1500 V, or between 750 V and 1500 V, or between 850 V and 1500 V, or between 1000 V and 1500 V. Alternatively, the operating voltage of the secondary sub-system is between 500 V and 1250 V, or between 500 V and 1000 V, or between 500 V and 850 V, such as e.g. between 580 V and 850 V or between 550 V and 750 V.

According to at least one example embodiment, the operating voltage of the primary sub-system is higher than then operating voltage of the secondary sub-system. According to at least one example embodiment, the operating voltage of the primary sub-system is at least twice as high as the operating voltage of the secondary sub-system.

According to at least one example embodiment, the operating voltage of the primary sub-system is between 60 V and 1500 V, such as e.g. between 80 V and 1500 V, or between 100 V and 1500 V, or between 120 V and 1500 V, or between 220 V and 1500 V, or between 400 V and 1500 V, or between 500 V and 1500 V, and the operating voltage of the secondary sub-system is between 60 V and 1500 V, such as e.g. between 80 V and 1500 V, or between 100 V and 1500 V, or between 120 V and 1500 V, or between 220 V and 1500 V, or between 400 V and 1500 V or between 500 V and 1500 V.

According to at least one example embodiment, the auxiliary equipment is a vehicle bodybuilder application.

According to at least one example embodiment, the vehicle bodybuilder application is at least one of the following: cement mixer, refuse truck equipment, crane, hook lift, tipper, refrigeration (e.g. heat pump and/or fans), car transporter lifter and ramps, sewage/slurry truck pump, bulk compressor, access vehicle ladder and firetruck equipment. The bodybuilder application may be a truck bodybuilder application.

According to at least one example embodiment, the power requirement of the auxiliary equipment or vehicle bodybuilder application is at least 10 kW, or at least 20 kW.

According to at least one example embodiment, the auxiliary equipment is referred to as a bodybuilder equipment. Alternatively, the auxiliary equipment is a high voltage equipment or a high voltage auxiliary equipment. According to at least one example embodiment, the auxiliary equipment is different to an auxiliary load of the primary sub-system. Such auxiliary load of the primary sub-system may be one of the following: coolant pumps, coolant fans, coolant heater, air compressor (for brakes), AC compressor (climate), heat pumps (in cooling system), defrosters, cab climate units, cab living equipment (lamp, microwave, TV, etc.).

According to at least one example embodiment, the electrical properties of the first battery pack arrangement is different to the electrical properties of the second battery pack arrangement.

Hereby, different battery pack arrangements may be used in the primary sub-system and in the secondary sub-system. Alternatively, the electrical properties of the battery pack(s) in the first battery pack arrangement is different to the electrical properties of the battery pack(s) in the second battery pack arrangement. For example, the different electrical properties may here be referring to different operating voltage, different internal resistance, different energy storage capacity, different charge/discharge power abilities, different cell chemistry and/or different electro-chemical properties.

According to at least one example embodiment, the electromobility system comprises a switch arranged in parallel to the DC/DC-converter and configured to galvanically connect the primary sub-system with the secondary sub-system in coupled state.

Hereby, the primary sub-system and the secondary sub-system may be galvanically connected, e.g. by providing a low-ohmic connection between the primary and the secondary sub-systems. Thus, the system may be configured to, in the coupled state, galvanically connect the primary sub-system with the secondary sub-system. Hereby, a galvanically connected system of the primary and secondary sub-systems can be realised at will by applying the switch, and the advantages of a galvanically connected system assimilated. Correspondingly, a galvanic separation of the primary and secondary sub-systems can be realised at will by applying the switch, and the disadvantages of having a galvanically connected system avoided. The switch may typically comprise a contactor, or other electrically controlled switch.

According to at least one example embodiment, the secondary sub-system may be changed without effecting the primary sub-system.

As mentioned earlier, the galvanically separated sub-systems provide for the possibility to change, adapt or exchange the secondary sub-system without changing the configuration, design or operational power of the primary sub-system.

According to a second aspect of the invention, a method for operating an electromobility system in a vehicle, the electromobility system comprising a primary sub-system including at least a first battery pack arrangement configured to power an electric machine for propelling the vehicle, a secondary sub-system including at least a second battery pack arrangement configured to power an auxiliary equipment, and a DC/DC-converter arranged and configured to galvanically separate the primary sub-system from the secondary sub-system, is provided. The method comprises:

in a first state, powering the electric machine by the first battery pack arrangement of the primary sub-system independently of the secondary sub-system, and powering the auxiliary equipment by the second battery pack arrangement of the secondary sub-system independently of the primary sub-system; and in a second state, powering the auxiliary equipment by the second battery pack arrangement of the secondary sub-system and, via the DC/DC-converter, the first battery pack arrangement of the primary sub-system.

Effects and features of the second aspect of the invention are largely analogous to those described above in connection with the first aspect of the invention. Embodiments mentioned in relation to the first aspect of the invention are largely compatible with the second aspect of the invention, of which some are exemplified below.

According to at least one example embodiment, the method comprises charging the second battery pack of the secondary sub-system by the primary sub-system via the DC/DC-converter. The charging may be performed by the first battery pack arrangement or a charging interface of the primary sub-system which is connected to the grid. Such charging may e.g. be performed in the second state.

As mentioned in accordance with the first aspect of the invention, the DC/DC-converter may be a bidirectional DC/DC-converter configured to transfer power from the primary sub-system to the secondary sub-system, and from the secondary sub-system to the primary sub-system. Hereby, the method may comprise, in a third state, supplying power to the primary sub-system, e.g. powering an auxiliary load or the electric machine, from the second battery pack arrangement of the secondary sub-system via the DC/DC-converter. Moreover, the method may comprise charging the battery pack(s) of the first battery pack arrangement by means of the secondary battery pack arrangement via the DC/DC-converter (e.g. in the third state, or in a separate alternative third state).

According to a third aspect of the invention, a computer program comprising program code means for performing the method according to the second aspect of the invention, when the program is run on a computer, is provided.

According to a fourth aspect of the invention, a computer readable medium carrying a computer program comprising program code means for performing the method according the first aspect of the invention, when the program product is run on a computer, is provided.

Effects and features of the third and fourth aspects of the invention are largely analogous to those described above in connection with the first and second aspects of the invention. Embodiments mentioned in relation to the first and second aspects of the invention are largely compatible with the third and fourth aspects of the invention.

According to a fifth aspect of the invention, a vehicle comprising an electromobility system according to the first aspect of the invention is provided.

Effects and features of the fifth aspect of the invention are largely analogous to those described above in connection with the first aspect of the invention. Embodiments mentioned in relation to the first aspect of the invention are largely compatible with the fifth aspect of the invention, of which some are exemplified below.

According to at least one example embodiment, the vehicle comprises a computer, e.g. in the form of an electrical control unit, ECU, comprising a computer program in accordance with the third aspect of the invention, and/or a computer readable medium carrying a computer program comprising program code means in accordance with the fourth aspect of the invention.

According to at least one example embodiment, the vehicle is an electric vehicle, for example an electric truck, or an electric construction machine or an electric working machine.

According to at least one example embodiment, the secondary sub-system may comprise at least one of the following configurations and/or functionalities: an isolation resistance monitoring, a high voltage interlock loop switch or circuitry for protection against unintentional access to the auxiliary equipment, a continuity test application and discharge functionality.

According to at least one example embodiment, applicable to any one of the first to fifth aspects of the invention, each battery pack comprises a plurality of series-connected battery cells, and may simply be referred to as a battery. The batteries may be adapted for a vehicle, such as e.g. a heavy duty truck.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
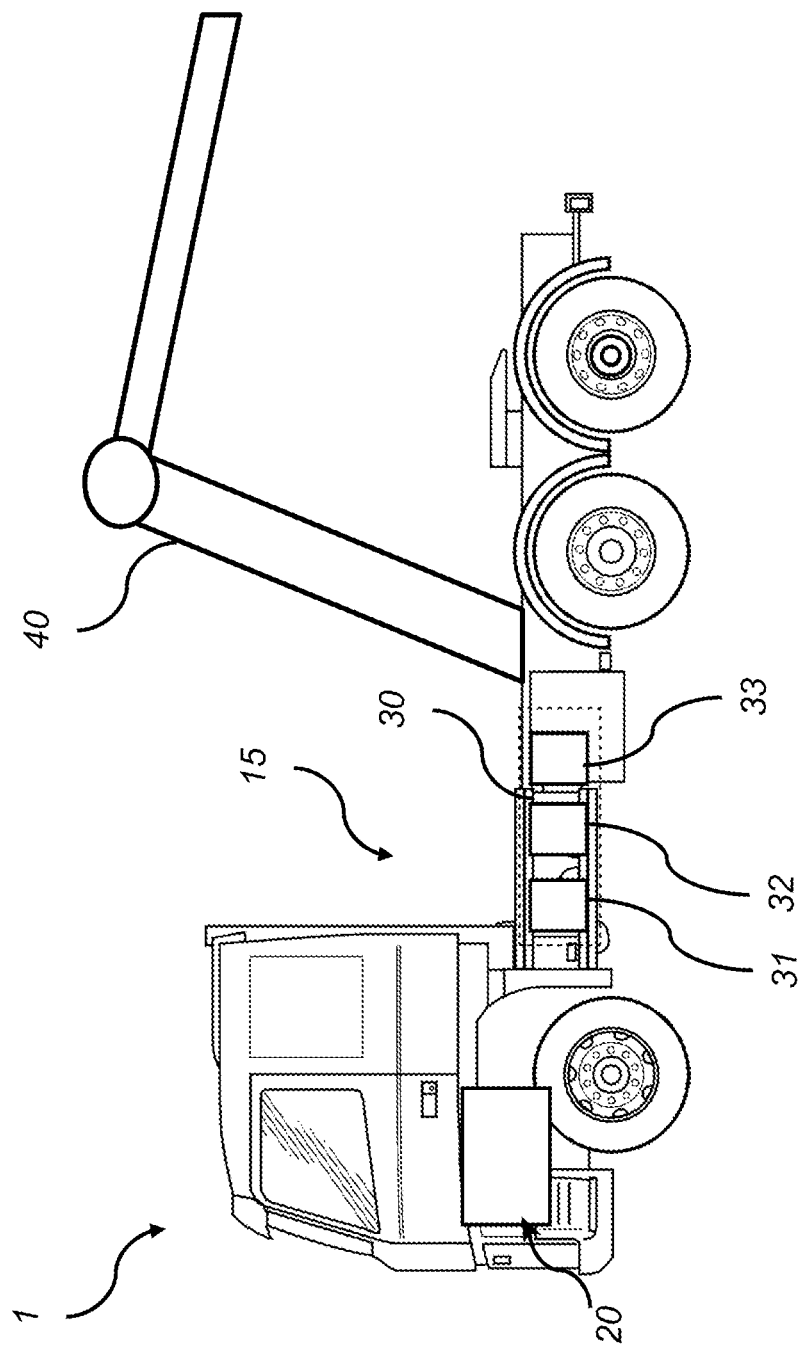
FIG. 1 is a side schematic view of a vehicle in accordance with an example embodiment of the invention.

With reference to FIG. 1, a vehicle 1, here embodied as a heavy duty truck 1, is disclosed for which an electromobility system 15 of a kind disclosed in the present invention is advantageous. However, the electromobility system 15 may as well be implemented in other types of vehicles, such as in busses, light-weight trucks, passenger cars, marine applications etc. The vehicle 1 is an electric vehicle, such as a full electric vehicle or a hybrid, comprising at least one electric machine 20, an energy storage system 30 comprising three energy storage devices 31, 32, 33, in the form of battery packs, the energy storage system 30 being arranged and configured to power the electric machine 20 by means of the electromobility system 15. Moreover, the vehicle 1 comprises an auxiliary equipment 40 arranged and configured for being powered by the energy storage system 30, the auxiliary equipment 40 being e.g. a lifting equipment. Thus, the energy storage system 30 and the electromobility system 15 are arranged and configured to supply at least two different loads 20, 40 with electric power, the first load being the electric machine 20, and the second load being the auxiliary equipment 40. The energy storage system 30 may be connected to an electrical energy source via an energy transfer means (not shown), typically a cable for transferring electrical energy to the battery packs 31, 32, 33. Hereby, the battery packs 31, 32, 33 may be charged with electrical energy. The vehicle 1 typically further comprises other parts of the powertrain such as transmission, drive shafts and wheels (not shown in detail).

Figure 2:
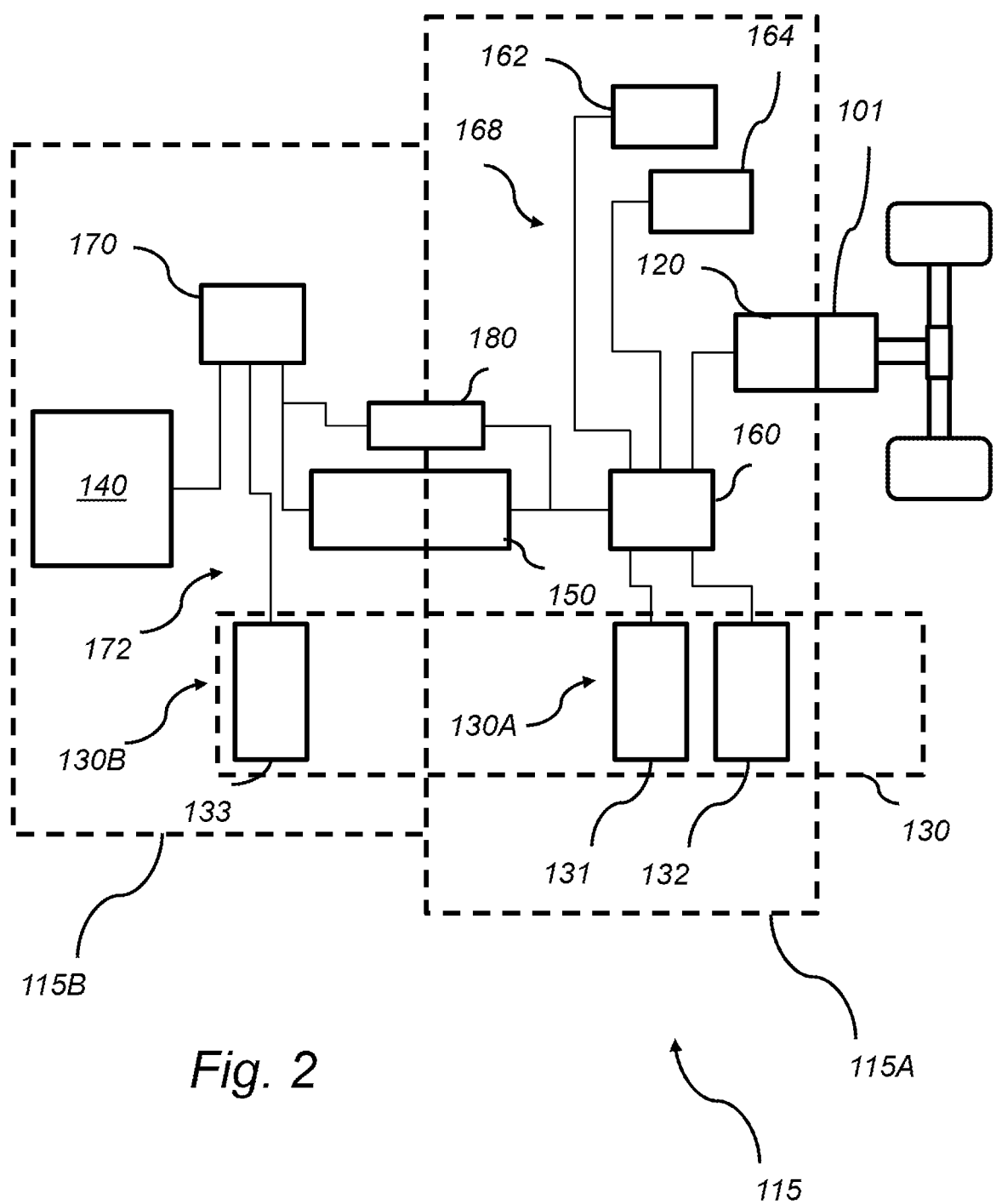
FIG. 2 is a schematic view of an electromobility system for a vehicle in accordance with an example embodiment of the invention.

FIG. 2 is a schematic view of an example embodiment of the electromobility system 115 comprising an energy storage system 130, which may be implemented as the electromobility system 15 as shown in FIG. 1. In FIG. 2, the electromobility system 115 comprises a primary sub-system 115A including a first battery pack arrangement 130A configured to power an electric machine 120 (as for example the electric machine 20 shown in FIG. 1) for propelling the vehicle, and a secondary sub-system 115B including a second battery pack arrangement 130B configured to power an auxiliary equipment 140, e.g. a vehicle bodybuilder application (as for example the lifting equipment 40 shown in FIG. 1). The first battery pack arrangement 130A comprises a first primary battery pack 131 and a second primary battery pack 132, and the second battery pack arrangement 130B comprises a first secondary battery pack 133, however other configurations with different number of battery packs are within the scope of the invention. The electromobility system 115 of FIG. 2 further comprises a DC/DC-converter 150 arranged and configured to galvanically separate the primary sub-system 115A from the secondary sub-system 115B. Preferably, the DC/DC-converter 150 is a galvanically separating DC/DC-converter 150.

The primary sub-system 115A comprises a primary junction box 160, a charging interface 162, a traction voltage system 164 including any primary auxiliary load, and an electric machine 120 coupled to the transmission 101 of the vehicle. The electric machine 120 may refer to one or more electric machines and any associated control electronics. Moreover, the primary sub-system comprises a first network of cables 168 connecting the components in the primary sub-system 115A and the DC/DC-converter 150. Hereby, the components in the primary sub-system 115A is galvanically connected to each other, as e.g. the first battery pack arrangement 130A is galvanically connected with the electric machine 120. Typically, the operating voltage of the first sub-system 115A is between 500 V and 1500 V.

The secondary sub-system 115B comprises a secondary junction box 170, and a second network of cables 172 connecting the components in the secondary sub-system 115B and the DC/DC-converter 150. Hereby, the components in the secondary sub-system 115B is galvanically connected to each other, as e.g. the second battery pack arrangement 130B is galvanically connected with the auxiliary equipment 140. Typically, the operating voltage of the secondary sub-system 115B is between 60 V and 850 V.

The functionality of the electromobility system 115 will now be described in the following, with the presumption that the electromobility system 115 is installed in a vehicle. The electromobility system 115 is configured to, in a first state, power the electric machine 120 by the first battery pack arrangement 130A of the primary sub-system 115A independently of the secondary sub-system 115B, and is configured to power the auxiliary equipment 140 by the second battery pack arrangement 130B in the secondary sub-system 115B independently of the primary sub-system 115A. This is possible owing to the DC/DC-converter 150 separating the primary sub-system 115A and the secondary sub-system 115B. Moreover, the electromobility system 115 is configured to, in a second state, power the auxiliary equipment 140 by the second battery pack arrangement 130B of the secondary sub-system 115B and, via the DC/DC-converter 150, the first battery pack arrangement 130A of the primary sub-system 115A. That is, in the second state, power is transferred from the primary sub-system 115A to the secondary sub-system 115B via the DC/DC-converter 150. The DC/DC-converter 150 may be bidirectional or unidirectional. In the latter case, the DC/DC-converter is configured to transfer power from the primary sub-system 115A to the secondary sub-system 115B. For example, the second battery pack arrangement 130B may be charged by the first battery pack arrangement 130A (or the charging interface 162) of the primary sub-system 115A via the DC/DC-converter 150. In other words, the second battery pack arrangement 130B may be charged by the primary sub-system 115A via the DC/DC-converter 150.

According to one example embodiment, the electrical properties of the first battery pack arrangement 130A is different to the electrical properties of the second battery pack arrangement 130B. Or stated differently, the electrical properties of the first primary battery pack 131 and the second primary battery pack 132 are different to the electrical properties of the first secondary battery pack 133. For example, the primary and secondary battery packs have different capacitance, different cell chemistry and/or different electro-chemical properties.

According to yet another example embodiment, the electromobility system 115 comprise a switch 180 arranged in parallel to the DC/DC-converter 150 and being configured to galvanically connect the primary sub-system 115A with the secondary sub-system 115B in coupled state. The switch 180 may e.g. be an electrically-controlled switch or contactor.

Figure 3:
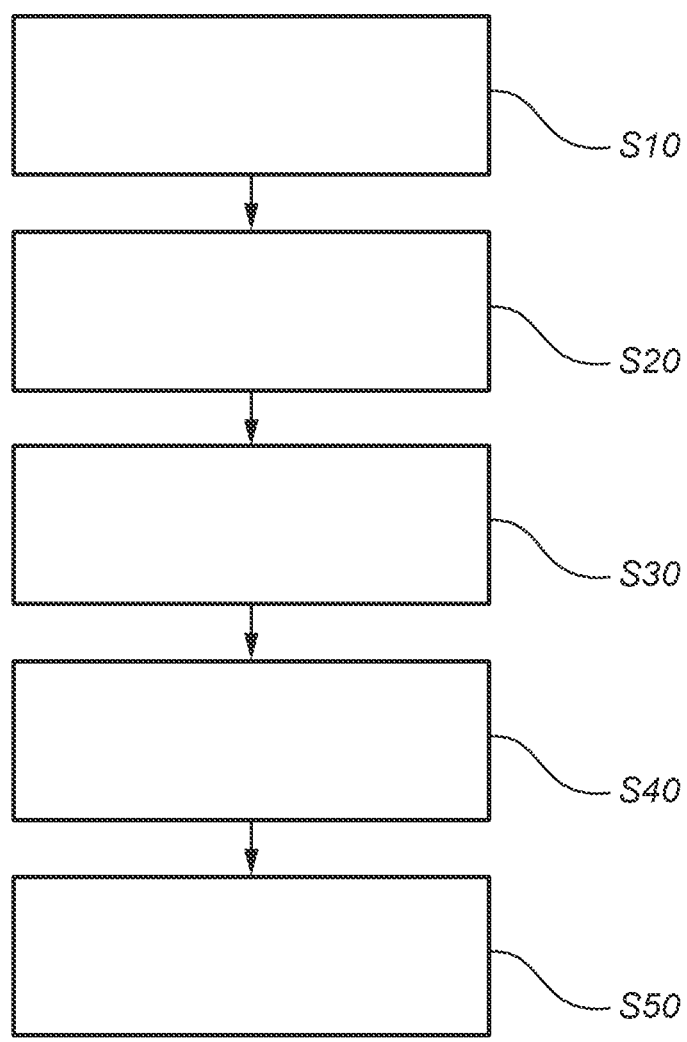
FIG. 3 is a flowchart illustrating the steps of a method in accordance with example embodiments of the invention.

The invention will now be described with reference to a method for operating an electromobility system in a vehicle, such as e.g. the electromobility systems 15, 115 of FIG. 1 and FIG. 2, with reference to the flow chart of FIG. 3. The electromobility system referred to in the flow chart of FIG. 3 comprises a primary sub-system including at least a first battery pack arrangement configured to power an electric machine for propelling the vehicle, a secondary sub-system including at least a second battery pack arrangement configured to power an auxiliary equipment, and a DC/DC-converter arranged and configured to galvanically separate the primary sub-system from the secondary sub-system (as the embodiment shown in FIG. 2).

In a first step S10 the electric machine is powered by the first battery pack arrangement of the primary sub-system independently of the secondary sub-system.

In a second step S20, which may be performed prior to, subsequently or at least partly simultaneously with the first step S10, the auxiliary equipment is powered by the second battery pack arrangement of the secondary sub-system independently of the primary sub-system.

The first and second steps S10, S20 may be performed in a first state of the electromobility system. In the first state, the DC/DC-converter does not transfer any power.

In a third step S30, the auxiliary equipment is powered by the second battery pack arrangement of the secondary sub-system and, via the DC/DC-converter, the first battery pack arrangement of the primary sub-system.

In a fourth, optional, step S40, the second battery pack arrangement is charged by means of the primary sub-system and via the DC/DC-converter, e.g. by utilising the first battery pack arrangement.

The third step S30, and optional fourth step S40, may be performed in a second state of the electromobility system. In the second state, the DC/DC-converter is transferring power from the primary sub-system to the secondary sub-system.

In a fifth, optional, step S50, power is transferred from the secondary sub-system to the primary sub-system to aid in powering a load, and/or charging the first battery pack arrangement.

The optional fifth step S50 may be performed in third state of the electromobility system. In the third state, the DC/DC-converter is transferring power from the secondary sub-system to the primary sub-system.

It should be noted that the naming of the steps not necessarily, but might according to at least one example embodiment, relate to the order in which the steps are carried out. Thus, the order of the steps may be different than that explained here, and the electromobility system 115 of FIG. 2 may be configured to carry out one or several of the steps. Moreover, one or more of the steps may be combined and carried out simultaneously.

It should be noted that the electromobility system 115 of FIG. 2 may be implemented as the electromobility system 15 in vehicle 1 of FIG. 1, and may comprise a control unit having a computer program comprising program code means for performing at least some of the method steps described with reference to FIG. 3

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An electromobility system for a vehicle comprising:
   a primary sub-system including at least a first battery pack arrangement configured to power an electric machine for propelling the vehicle,
   a secondary sub-system being a high voltage sub-system and including at least a second battery pack arrangement configured to power an auxiliary equipment,
   a DC/DC-converter arranged and configured to galvanically separate the primary sub-system from the secondary sub-system, wherein the system is configured to, in a first state, power the electric machine by the first battery pack arrangement of the primary sub-system independently of the secondary sub-system, and power the auxiliary equipment by the second battery pack arrangement in the secondary sub-system independently of the primary sub-system; and
   in a second state, power the auxiliary equipment by the second battery pack arrangement of the secondary sub-system and, via the DC/DC-converter, the first battery pack arrangement of the primary sub-system.

2. The electromobility system according to claim 1, wherein the primary sub-system is configured to galvanically connect the first battery pack arrangement with the electric machine, and the secondary sub-system is configured to galvanically connect the second battery pack arrangement with the auxiliary equipment.

3. The electromobility system according to claim 1, wherein the DC/DC-converter is a galvanically separating DC/DC-converter.

4. The electromobility system according to claim 1, wherein the DC/DC-converter is a unidirectional DC/DC-converter configured to transfer power from the primary sub-system to the secondary sub-system.

5. The electromobility system according to claim 1, wherein the system is configured to charge the second battery pack arrangement of the secondary sub-system by the primary sub-system via the DC/DC-converter.

6. The electromobility system according to claim 1, wherein the operating voltage of the secondary sub-system is between 60 V and 850 V.

7. The electromobility system according to claim 1, wherein the auxiliary equipment is at least one of: a cement mixer, refuse truck equipment, a crane, a hook lift, a tipper, refrigeration equipment, a car transporter lifter and ramps, a truck pump, a bulk compressor, an access vehicle ladder and firetruck equipment.

8. The electromobility system according to claim 1, wherein the electrical properties of the first battery pack arrangement are different to the electrical properties of the second battery pack arrangement.

9. The electromobility system according to claim 1, comprising a switch arranged in parallel to the DC/DC-converter and configured to galvanically connect the primary sub-system with the secondary sub-system in coupled state.

10. The electromobility system according to claim 1, wherein the secondary sub-system may be changed without effecting the primary sub-system.

11. A method for operating an electromobility system in a vehicle, the electromobility system comprising a primary sub-system including at least a first battery pack arrangement configured to power an electric machine for propelling the vehicle, a secondary sub-system being a high voltage sub-system and including at least a second battery pack arrangement configured to power an auxiliary equipment, and a DC/DC-converter arranged and configured to galvanically separate the primary sub-system from the secondary sub-system, the method comprising:

in a first state, powering the electric machine by the first battery pack arrangement of the primary sub-system independently of the secondary sub-system, and powering the auxiliary equipment by the second battery pack arrangement of the secondary sub-system independently of the primary sub-system; and in a second state, powering the auxiliary equipment by the second battery pack arrangement of the secondary sub-system and, via the DC/DC-converter, the first battery pack arrangement of the primary sub-system.

12. The method according to claim 11, comprising charging the second battery pack of the secondary sub-system by the primary sub-system via the DC/DC-converter.

13. A non-transitory computer readable medium storing a computer program comprising program code for performing the method according to claim 11, when the computer program is run on a computer.

14. A vehicle comprising an electromobility system according to claim 1.

* * * * *